United States Patent
Xu et al.

(10) Patent No.: US 11,354,349 B1
(45) Date of Patent: Jun. 7, 2022

(54) IDENTIFYING CONTENT RELATED TO A VISUAL SEARCH QUERY

(71) Applicant: Pinterest, Inc., San Francisco, CA (US)

(72) Inventors: Jiajing Xu, Palo Alto, CA (US); Andrei Curelea, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 436 days.

(21) Appl. No.: 15/893,570

(22) Filed: Feb. 9, 2018

(51) Int. Cl.
- G06F 16/50 (2019.01)
- G06F 16/20 (2019.01)
- G06N 3/04 (2006.01)
- G06V 10/40 (2022.01)
- G06F 16/532 (2019.01)
- G06F 16/248 (2019.01)
- G06F 16/2457 (2019.01)

(52) U.S. Cl.
CPC .......... *G06F 16/532* (2019.01); *G06F 16/248* (2019.01); *G06F 16/24578* (2019.01); *G06N 3/04* (2013.01); *G06V 10/40* (2022.01)

(58) Field of Classification Search
CPC . G06F 16/532; G06F 16/24578; G06F 16/248
See application file for complete search history.

(56) References Cited

U.S. PATENT DOCUMENTS

| | | | | |
|---|---|---|---|---|
| 2010/0226563 | A1* | 9/2010 | Takayama | G06K 9/6253 382/154 |
| 2011/0029510 | A1* | 2/2011 | Kroon | G06F 16/51 707/723 |
| 2015/0370830 | A1* | 12/2015 | Murphy-Chutorian | G06F 16/5838 707/748 |
| 2019/0205928 | A1* | 7/2019 | Lee | G06F 16/90335 |

OTHER PUBLICATIONS

Jing et al. Visual Search at Pinterest, Oct. 13, 2015 [retrieved on Mar. 24, 2020], Retrieved from the Internet:< URL: https://arxiv.org/pdf/1505.07647v1 > (Year: 2015).*

Simonyan and Zisserman, "Very Deep Convolutional Networks for Large-Scale Image Recognition," (Apr. 10, 2015) [online] (retrieved from https://arxiv.org/pdf/1409.1556.pdf), 14 pages.

Zhai et al., "Visual Discovery at Pinterest," (May 25, 2017) [online] (retrieved from https://arxiv.org/pdf/1702.04680.pdf), 10 pages.

* cited by examiner

*Primary Examiner* — Kristopher Andersen
(74) *Attorney, Agent, or Firm* — Athorus, PLLC (57) ABSTRACT

A system for visual discovery is disclosed. The system identifies a visual search query in response to an action associated with an image presented to a user of a client device. The system extracts visual features from the visual search query and compares the visual features with visual features of stored content items. The system then identifies a set of candidate visual content items from the stored content items that have visual features, which are similar to the visual features of the visual search query. The candidate visual content items are ranked using information from a user session and provided for display to the user.

25 Claims, 3 Drawing Sheets

IDENTIFYING CONTENT RELATED TO A VISUAL SEARCH QUERY

BACKGROUND

This specification relates to identifying and retrieving visual content.

A conventional search system can search for content using a visual search query, e.g., an image or a collection of images. Typical concerns for such a search system are whether the search system efficiently performs the search and quickly identifies relevant content for the visual search query.

SUMMARY

This specification describes technologies for identifying visual content items, also referred to herein as content items, to display to a user that are visually similar to particular visual content. These technologies generally involve a visual discovery system that filters and ranks visual content items to minimize the amount of time that is required to respond to a visual search query or to identify a visual content item that is related to a selected image of interest.

In general, one innovative aspect of the subject matter described in this specification can be embodied in methods that include the actions of identifying visually similar content. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

The foregoing and other embodiments can each optionally include one or more of the following features, alone or in combination. In particular, one embodiment includes all the following features in combination.

A visual search query may be identified in response to an action associated with an image presented to a user of a client device. Visual features may be extracted from the visual search query using a neural network that is trained on relevance information. The visual features of the visual search query are compared with visual features of a plurality of visual content items stored in a database. A set of candidate visual content items, also referred to herein as candidate content items, may be identified from the plurality of visual content items, each candidate visual content item of the set of candidate visual content items may have visual features that are similar to the visual features of the visual search query using an exact nearest neighbor algorithm. Each candidate visual content item in the set of candidate visual content items may be ranked using the information from a user session. One or more candidate visual content items may then be provided from the ranked set of candidate visual content items to the client device for display to the user.

Ranking each candidate visual content item in the set of candidate visual content items may be done using at least query features related to the visual search query, content features related to the visual search query, the visual search query and content balance features, or context features related to the visual search query.

Query features related to the visual query image may include user features related to the user from whom the visual query was received and features of the visual search query.

Information from a user session may include information about the user's previous search history in the current session.

Content features related to the visual search query may include a keyword of the visual search query, a category related to the visual search query, an advertisement identifier related to the candidate visual content item, or a campaign identifier related to the visual search query.

Query and content balance features may include similarity scores in text, category, and topic space between the visual search query and the candidate visual content item, a visual similarity score between the visual search query and the candidate visual content item, and a text embedding similarity score between the visual search query and the candidate visual content item.

The context features may include a type of device of the user from which the visual search query was received, a type of network used to send or receive the visual search query, a position of the visual search query on a content page, or a time of day at which the visual search query was received.

Prior to providing the set of candidate visual content items for display to the user, the set of candidate visual content items may be ranked for display to the user by a utility score calculated using a predicted click through rate of each candidate visual content item and a cost associated with each candidate visual content item.

The utility score for each candidate content item may be compared with a threshold to determine whether the score satisfies the threshold. When the utility score of a candidate visual content item does not satisfy the threshold, the candidate visual content item may be removed from the set of candidate visual content items for display.

The neural network may be a very deep convolutional network for large-scale image recognition.

Extracting visual features from the visual search query may occur in real time after receiving the visual search query from the user.

Ranking each candidate visual content item in the set of candidate visual content items may include: identifying, from the user session, at least one object in images from the user session in which the user has shown interest; for each candidate visual content item, determining whether the candidate visual content item contains at least one object in which the user has shown interest or an image that is visually similar to the at least one object in which the user has shown interest; and in response to determining that the candidate visual content item contains the at least one object in which the user has shown interest or an image that is visually similar to the at least one object in which the user has shown interest, increasing the ranking of the candidate visual content item to rank the candidate visual content item higher than candidate visual content items that do not contain the at least one object or do not contain an image that is visually similar to the at least one object.

The subject matter described in this specification can be implemented in particular embodiments so as to realize one or more of the following advantages. The visual discovery system described in this specification identifies content items using a visual search query that includes an image. The visual discovery system provides candidate content items that are visually similar to the visual search query by comparing the visual features of the visual search query to visual features of potential candidate content items. Using visual features allows the system to identify content items that more closely match a particular image used as the search query as compared to using text annotations associated with the image.

To quickly and efficiently identify candidate content items from a very large amount of stored content, the visual discovery system indexes the stored content and filters and ranks potential content items to determine the most relevant candidate visual content items for the visual search query.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

When identifying content items using a visual search query image, e.g., an image, a partial image, or a collection of images, a search system identifies content items that are visually similar to the visual search query, or a selected image of interest. This specification generally describes a visual discovery system that indexes stored content items and filters and ranks potential candidate content items to quickly identify items that are responsive to a particular image used as a search query.

For example, a social media platform may present a number of images. A particular user may save particular images to one or more collections for subsequent viewing. The user can also enlarge a particular image through selection, sometimes referred to in this specification as a closeup view. The content of such a selected image can be used by the visual discovery system, e.g., as a visual search query, to identify one or more content items that are relevant to the selected image based at least in part on visual similarity between the selected image and the content items. The one or more identified content items can be presented in a user interface in relation to the selected image. This specification describes techniques for identifying and providing these visually similar content items. Visually similar content items are content items that include images that are visually exact, which are an exact match to an image query and images that are in a similar type or style to the image query. For example, if an image query is an image of a bag, visually similar content items can include content items that have bags in a similar style. Visually similar items to an image query of a bag may also include content items that contain images of the exact bag.

Figure 1:
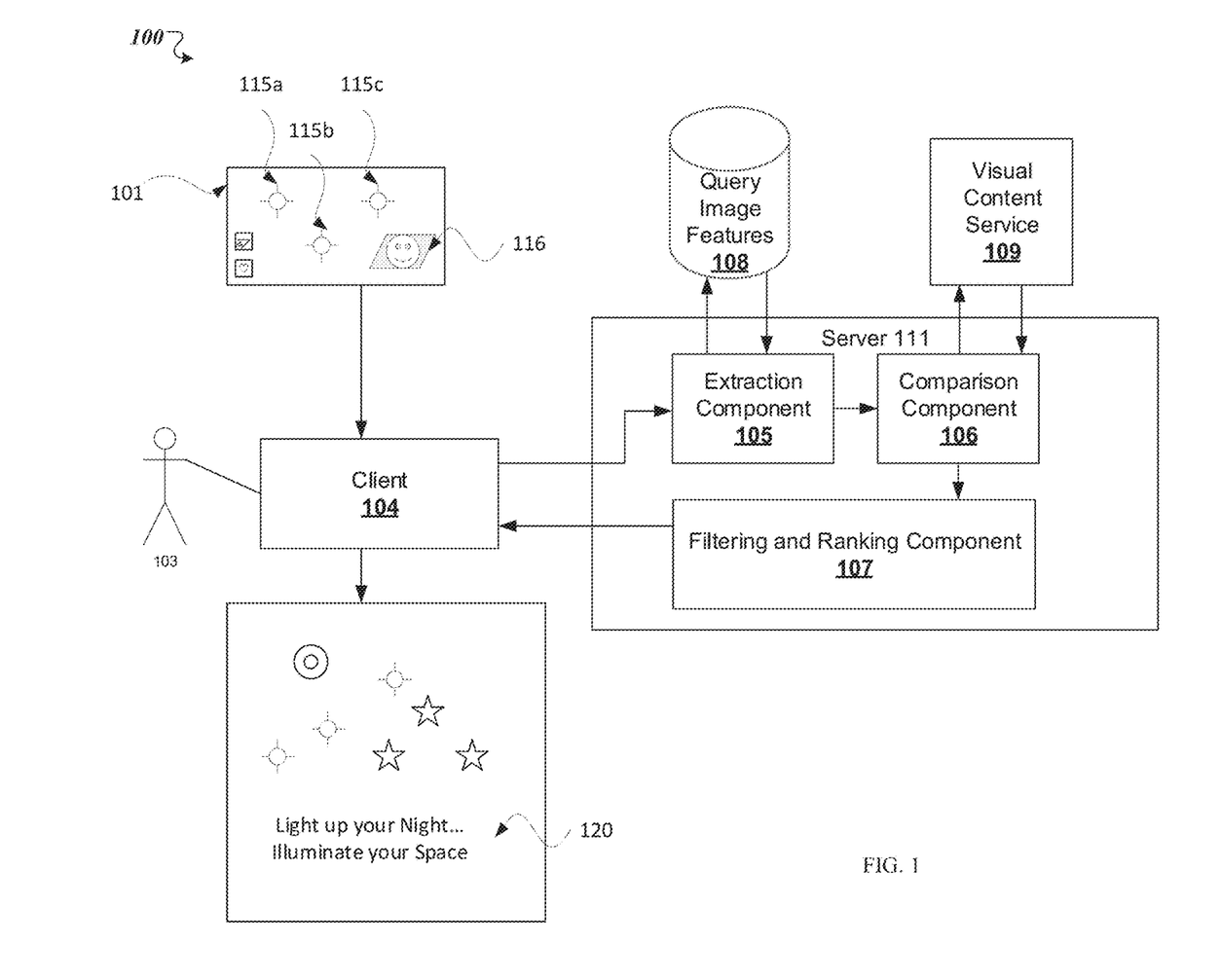
FIG. 1 illustrates an example visual discovery system.

FIG. 1 illustrates an example visual discovery system 100. The visual discovery system 100 is an example of a system implemented as computer programs on one or more computers in one or more locations, in which components and techniques described below can be implemented. The visual discovery system 100 interacts with a client device 104. The client device 104 receives one or more images from the visual discovery system 100. In response to user interaction with a particular image, e.g., the user selecting the image for a close up view, the visual discovery system 100 identifies a visual search query 101. The client device 104 also displays at least one search result 120 for the user, e.g., as a suggestion of a related image. The visual discovery system 100 includes a server 111 that receives a user selection of an image to identify the visual search query from the client device 104 and determines search results that are responsive to the visual search query 101.

A user 103 causes a query to the visual discovery system 100 by selecting a particular presented image provided by the visual discovery system 100. The visual search query can include various types of image content including image content representing one or more people, places, and/or things. The visual search query may also include a text description related to the image, a topic that is related to the image, and/or a category for the image. For example, the text descriptions related to the image may be stored as metadata associated with the image.

For example, as illustrated in FIG. 1, the user-selected image used as a visual search query has visual content that includes three lights (115a-c) and a smiling face on a poster (116). The selected image can be associated with one or more annotations. The annotations can include a category or classification vector that indicates the categories with which the image is related. The image used for the visual search query 101 may be categorized as 90% home décor, 5% design, and 5% art. This category information may be pre-defined and included as metadata or an annotation with the visual search query executed by the visual discovery system 100. The visual discovery system 100 can use the category information along with visual features to find content items that are related to the user-selected image.

In some implementations, the user 103 can select an image from images provided by the visual discovery system 100 to the client device 104, e.g., an image from a collection of images presented by the visual discovery system 100 running in a web browser or other application on the client device. For example, the visual discovery system 100 can provide a collection of images for presentation in response to a textual query submitted by the user or as selected by the visual discovery system 100 based on one or more categories associated with the user.

In some other implementations, the user can upload an image to the visual discovery system 100 using the client device 104, e.g., images from local or remote storage, and use that image as the visual search query 101. The client device 104 sends the image chosen by the user 103 to the server 111 where it can be used as the visual search query.

The server 111 includes an extraction component 105 for extracting image features from the visual search query 101, a comparison component 106 that compares image features from visual search queries with extracted features of stored content items, and a filtering and ranking component 107 that filters and ranks potential candidate search result content items.

The extraction component 105 extracts image features from the visual search query 101 by performing an extraction process that uses a neural network, e.g., a convolution neural network, to obtain visual features from the visual search query.

A neural network is a machine learning model that employs one or more layers of non-linear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the neural network generate an output from a received input and a respective set of parameters, while other layers of the neural network may not have parameters.

Parameters can include at least one or more of the following: how many layers should be processed, corresponding sets of weight inputs for each layer of the multiple layers, an initial set of activation inputs, i.e., the input to the neural network from which the interference is to be computed, corresponding input and output sizes of each layer, a stride value for the neural network computation, and a type of layer to be processed, e.g., a convolutional layer or a fully connected layer.

The extraction component 105 uses the neural network to compute inferences for the visual search query 101, i.e., process the input through the layers of the neural network to generate a neural network output for the input. In the visual discovery system 101, the neural network takes in a visual search query image as input and outputs extracted features and a visual embedding associated with the visual search query image.

The extraction component 105 uses the second to last fully connected layer of the neural network as visual embedding for the visual search query. This layer is represented as a vector that is binarized to save space and make computations more efficient and to make the visual embedding more robust. For example, without binarizing, the vector may be 4096 floats whereas after binarizing, the vector may be 512 bytes. Binarizing is one regularization method to make the neural network better at generalizing beyond the training data. In some implementations, the neural network may be a VGG network, e.g., a VGG network proposed by K. Simonyan and A. Zisserman from the University of Oxford in the paper, "Very Deep Convolutional Networks for Large-Scale Image Recognition."

In some implementations, the visual discovery system 100 extracts features of a visual search query in real time once a user 103 has selected a particular presented image. In some other implementations, the visual discovery system 100 extracts features from images in an offline process separate from a user selection. The visual discovery system 100 can select a set of images from a repository to perform offline feature extraction. For example, the visual discovery system 100 can determine images from the visual discovery system's content item repository that a user is likely to select based on search or click history of the user or other users of the visual discovery system 100.

For example, the visual discovery system 100 can identify a subset of images that have a threshold popularity with a collection of users such that they are likely to encompass the majority of user selections. This subset of images can be periodically updated as the image contents of the visual discovery system can rapidly change.

The visual discovery system 100 can additionally or alternatively determine how likely it is that a user will interact with a specific content item based on historical information, time of day information, the device the user is using, the similarity between a close-up view of an image and a content item in visual embedding space, and/or user session or profile information. The visual discovery system 100 stores the extracted features of the visual search query 101 in a query image features repository 108.

The comparison component 106 compares the features of the visual search query 101 with content items stored in the visual discovery system 100. The stored content items may be accessed through an interface, e.g., a REST interface, or a service, e.g., a visual content service 109. The comparison component 106 determines the exact nearest neighbors in the visual embedding space of the visual search query 101. The system projects every visual query and content item to the visual embedding space, a 4096-bit binary space. The comparison computes the hamming distance between the visual embedding of the query and the content item. The smaller the distance, the closer the query is to the content item. The comparison component 106 then returns stored content items as candidate results that have visual features that are similar to the features of the visual search query. In some implementations, the stored content items have previously been evaluated to extract features and generate corresponding visual embedding information as described below.

The comparison component 106 determines similarities by comparing individual features of the stored content items with features of the visual search query and determines whether the features meet or exceed a given threshold similarity. A threshold may be chosen by having a good balance of precision and recall of content items. For example, if the threshold is too loose, the system may fill up the limited candidate list with undesirable results that have low relevance. The visual discovery system 100 can further limit the search space by using category/classification information from annotations or metadata associated with the visual search query 101. The system 100 may only search content items that are associated with the same categories/classifications as the visual search query 101. For example, although an image and a content item may be visually similar, they may belong to categories that are unlikely to engage in cross-engagement, e.g., the image may be categorized as "DIY" and the content item may be categorized as "History." Limiting a search to only similar categories and/or classifications can remove images and content items from the search results that a user is unlikely to be interested in and can improve the relevancy of presented content items. The system uses historical-click data to identify the top categories from which content items could come for each query category. For example, based on the category data, the system may only need to fetch content items from 4-5 categories on average from each given request.

The visual discovery system 100 then sends the candidate content items to the filtering and ranking component 107. While category filtering may occur in the comparison component 106, further filtering based on other information, e.g., budgets and targeting, occurs in the filtering and ranking component 107. The visual discovery system 100 can use different types of features to filter and rank candidate content items by a similarity score. For example, the visual discovery system 100 can use query features. The similarity score is the weighted combinations of the similarity in terms of text, topic, category, and visual spaces. Query features include text, topic, category, or pre-defined content that is related to the visual search query. Candidate content items that have several matching or similar query features to the visual search query 101 are ranked higher than those that have fewer matches or similarities. The similarity may be based on the predicted click through rate (pCTR). The threshold for the pCTR may be 1/10 of the average click through rate of the system.

The visual discovery system 100 may balance features between the visual search query 101 and the stored content items to filter or rank content items. Query and content balance features include similarity scores in text, category, and/or topic space between the visual search query and the content item, a visual similarity score between the visual search query and the content item, and/or a text embedding similarity score between the visual search query and the content item. This ranking combines visual similarity with other similarities to achieve a desired ranking, e.g., pCTR for promoted content.

The content items can be sponsored content items, e.g., advertisements. In some implementations, the visual discovery system 100 uses one or more advertisement features to filter and rank candidate content items. Advertisement features can include keywords of an advertisement, e.g., ad targeting keywords, advertiser identification, advertising campaign identification, and/or advertisement-specific features. For each advertisement, the advertiser identifier and the campaign identifier may be features in the ranking model. The weights for each advertisement may be learned by going through historical click data and determining how often an advertisement is clicked on by users.

The visual discovery system 100 can use one or more context features to filter and rank related content items. Context features can include: the time of day of a visual search request, the position of a visual search query image on a displayed page, the position of the visual search query image in a list if the visual search query image was in a list, e.g., a previous search results list, the type of client device that was used to make the visual search query request, the network from which the visual search query request came, information from a user session, and/or historical information about the user or visual search query image.

For example, the user 103 may have been interacting with multiple images in the user session that each contained a particular visual content, e.g., a red handbag. All of the images from the user session may be different, but each includes a similar style red handbag. The visual discovery system 100 can use the aggregate information from within the user session to determine that the user is interested in a red handbag. The system can then rank and/or filter subsequent search query results to surface content items with a red handbag for the user 103. The system may rank images that contain red handbags higher than other search results. The system can alternatively or additionally filter search results to only include content items that contain images of red handbags. The system may consider the weighted similarity between the advertisement candidate and each item in the user's session. The weights are the highest for the items with which the user just recently interacted and are the lowest for the items the user interacted with at the beginning of the user session.

In some implementations, the visual discovery system 100 may choose candidate content items to display to a user based on a selected image by using a weighted round robin algorithm. The system chooses candidate content items using different types of image features in a round-robin fashion until the set of candidate content items reaches a predetermined number of candidate content items, e.g., 200. For example, to choose candidate content items, the visual discovery system may first choose a content item that matches query features, next the visual discovery system can choose a content item that balances features of the visual search query and stored content items, then the visual discovery system can choose a content item with advertisement features that match the query features. For example, there may be three sets of candidates: Set A, which contains content items ranked by query features; Set B, which contains content items ranked by visual+query features; and Set C, which contains content items ranked by advertisement features. The visual discovery system associates a probability with each set, i.e., p_A, p_B, and p_C such that p_A+p_B+p_C=1. The probabilities can be tuned or learned from historical data. The system then generates a random number in the set [0, 1]. If the random number falls in (0, p_A) then the system pops the top content item from Set A and appends the content item to the set of candidate content items as a candidate content item. If the random number falls in (p_A, p_A+p_B), the system pops a content item from Set B and appends the content item to the set of candidate content items as a candidate content item. If the random number falls in (p_A+p_B, 1), the system pops a content item from Set C and appends the content item to the set of candidate content items as a candidate content item. The process of generating a random number, determining the appropriate set from which to choose a candidate content item, and appending a chosen candidate content item to the set of candidate content items is repeated until the set of candidate content items is full.

The visual discovery system 100 can rank candidate content items a second time using a utility score determined in part by the predicted click through rate of a given candidate content item. The predicted click through rate of a candidate content item is based on the historical click through rate of the candidate content item, e.g., prior instances where users have selected, or otherwise interacted, with the candidate content item after presentation. The utility score can be determined by multiplying the cost associated with the candidate content item with the predicted click through rate of the candidate content item. The cost associated with the candidate content item may be, for example, the price a content provider paid per candidate content item impression. The candidate content items can then be ranked by utility score.

The visual discovery system 100 determines candidate content items as search results for a selected image that is used as the visual search query 101. The system further filters and ranks the candidate content items before presenting one or more for display. In some implementations, the visual discovery system 100 provides a predetermined number of search results to the user. In other implementations, the visual discovery system 100 provides candidate content items as search results that satisfy a certain threshold utility score. Filtering and ranking candidate content items allows the visual discovery system to provide search results that are highly similar to the visual search query in a timely and efficient manner. Identifying visually similar content items to present also allows presented content items to blend in with other visual content in the user's interface.

Figure 2:
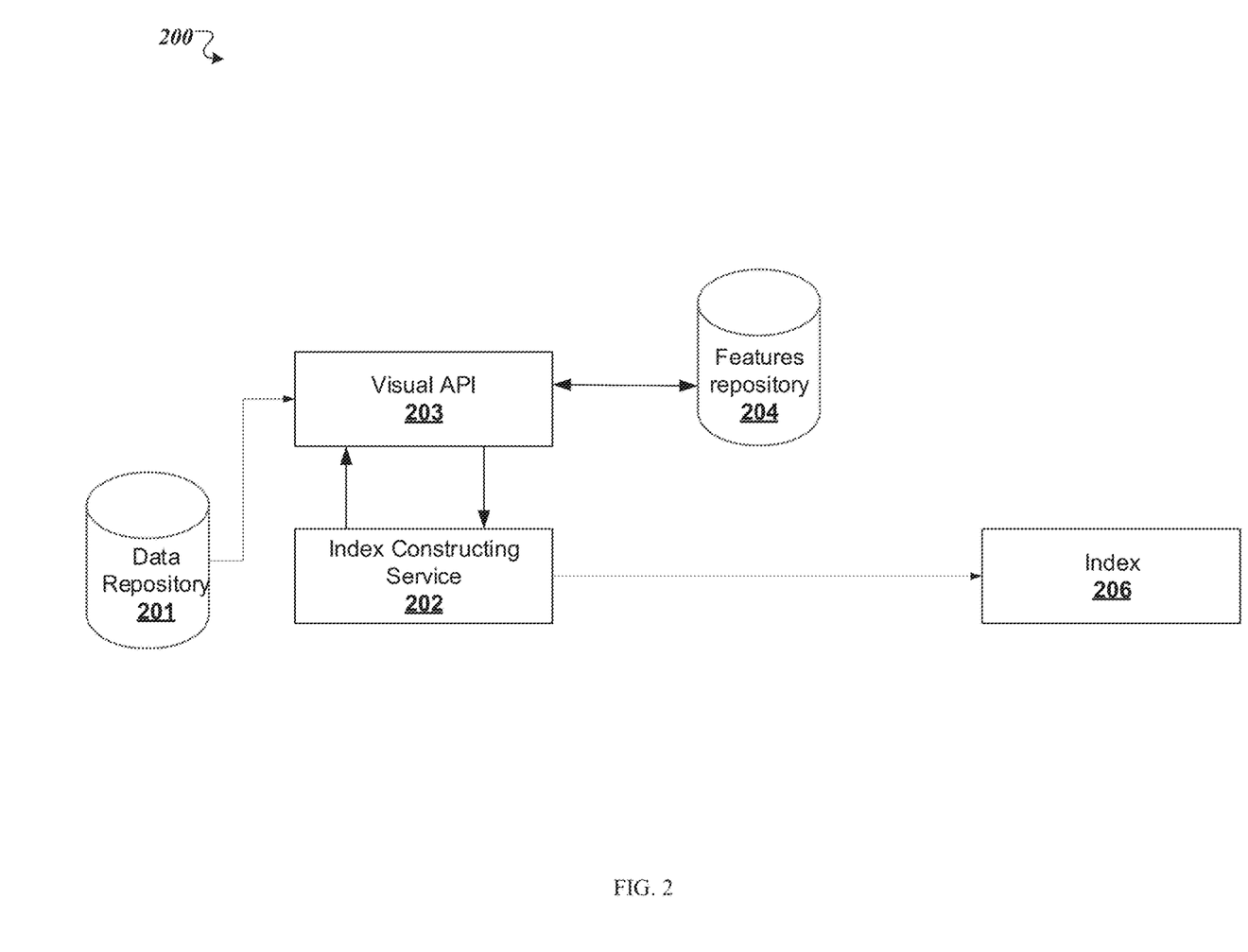
FIG. 2 illustrates an example system for creating an index.

Another aspect of the visual discovery system 100 that facilitates efficient searching for relevant visual content items is indexing and classifying stored visual content including images and content items. FIG. 2 illustrates an example system 200 for creating an index. The visual discovery system 200 can receive visual content from outside the system, e.g., from users, advertisers, or other third parties. This visual content is stored in a searchable data repository 201. The visual discovery system 200 extracts visual features from each content item or image when the content is added to the data repository 201. In some implementations, the visual discovery system 200 provides a visual application programming interface 203 that connects to the extracting process described above using a remote procedure call in order to perform the extraction.

For example, an advertiser may add advertisements for a new advertising campaign to the data repository 201 as content items to be displayed to users of the visual discovery system 200. After the advertiser adds the content items to the data repository 201, the visual discovery system 200 may extract visual features and determine a visual embedding for each content item using the extraction process detailed above. As more users interact with the new advertisement, the system can update the category and topic information related to the advertisement.

Once the visual features of the content item are extracted and stored in a features data repository 204, the visual discovery system 200 constructs an index 206, using an index constructing service 202, that indexes the visual features in binary format. This index of visual features can be queried when the comparison component of FIG. 1 tries to compare visual features of a visual search query with visual features of stored content items.

Loading the visual features for all content items in a data repository is costly, slow, and inefficient at runtime retrieval. In some implementations, the visual discovery system 200 may not maintain the visual features for all stored content items or index all visual features. Instead, the visual discovery system 200 may only load and index visual features for a subset of popular content. The content items to load in the client device 104 and visual features to index may be based on historical user requests, historical user interaction, or other information that provides insight into content items that users want. For example, when the visual discovery system 200 provides images (a content item) to display to a user, the visual discovery system 200 may only pre-load one-third of the stored images, but the one-third of the images may cover 98% of the images requested in the last week. The visual discovery system 200 may load visual features of content items into the index that correspond to the features of the most-requested images. If an image is selected that has not been pre-loaded, the visual discovery system 200 may determine and load the visual features of the image at the time of selection in order to identify related content items that should also be displayed with the selected image. The visual discovery system 200 can assign a classification or multiple classifications to content items from a list of pre-defined classifications.

Content items can be assigned a vector in which each element of the vector represents a probability that the content item belongs to a specific category/classification. For example, a content item may have a classification vector as follows: [0.6, 0.4, 0, 0, 0]. Each index of the vector represents a different classification. In this example, index 1 represents a "Do-It-Yourself" classification. Index 2 represents a "women's fashion" classification and indexes 3-5 represent, "men's fashion," "sports," and "quotes" respectively. The example classification vector shows that a content item is classified as 60% "Do-It-Yourself" and 40% "women's fashion." When determining which content items to include in a visual search query, the visual discovery system 200 can look at the classification vector of the visual search query and narrow the search space to only include content items in the search with similar classification vectors. Similarity may be defined as the inner product of the two classification vectors, i.e., given the query: [a,b,c] and item [d,e,f], the similarity is (a*d+b*e+c*f). For example, given the content item with the classification vector of [0.6, 0.4, 0, 0, 0], the visual discovery system 200 would search content items that are at least partially classified as "women's fashion" and/or "DIY." The visual discovery system 200 would not include content items that were classified as only "men's fashion" or "quotes."

Another aspect of the visual discovery system 200 that allows for efficient searching for relevant visual content items is training the neural network used in the extraction process, specifically using relevance information. During training, the neural network performs a neural network training procedure to adjust values of the parameters of the neural network, e.g., to determine trained values of parameters from initial values of the parameters using backpropagation. The neural network can be trained on relevance information to determine features most relevant to a given image or partial image. Visual content items with visual features are fine-tuned using human labeled data that signifies relevance. To determine relevance, a user views visual content items and labels each content item with features that are relevant to the content item. The neural network is then trained on the human labeled relevance data in order to learn relevant features and determine these features in subsequent input images. The visual discovery system 200 can use the neural network trained with relevance data to determine relevant features to an input visual search query and filter candidate content items to items having these relevant features.

Figure 3:
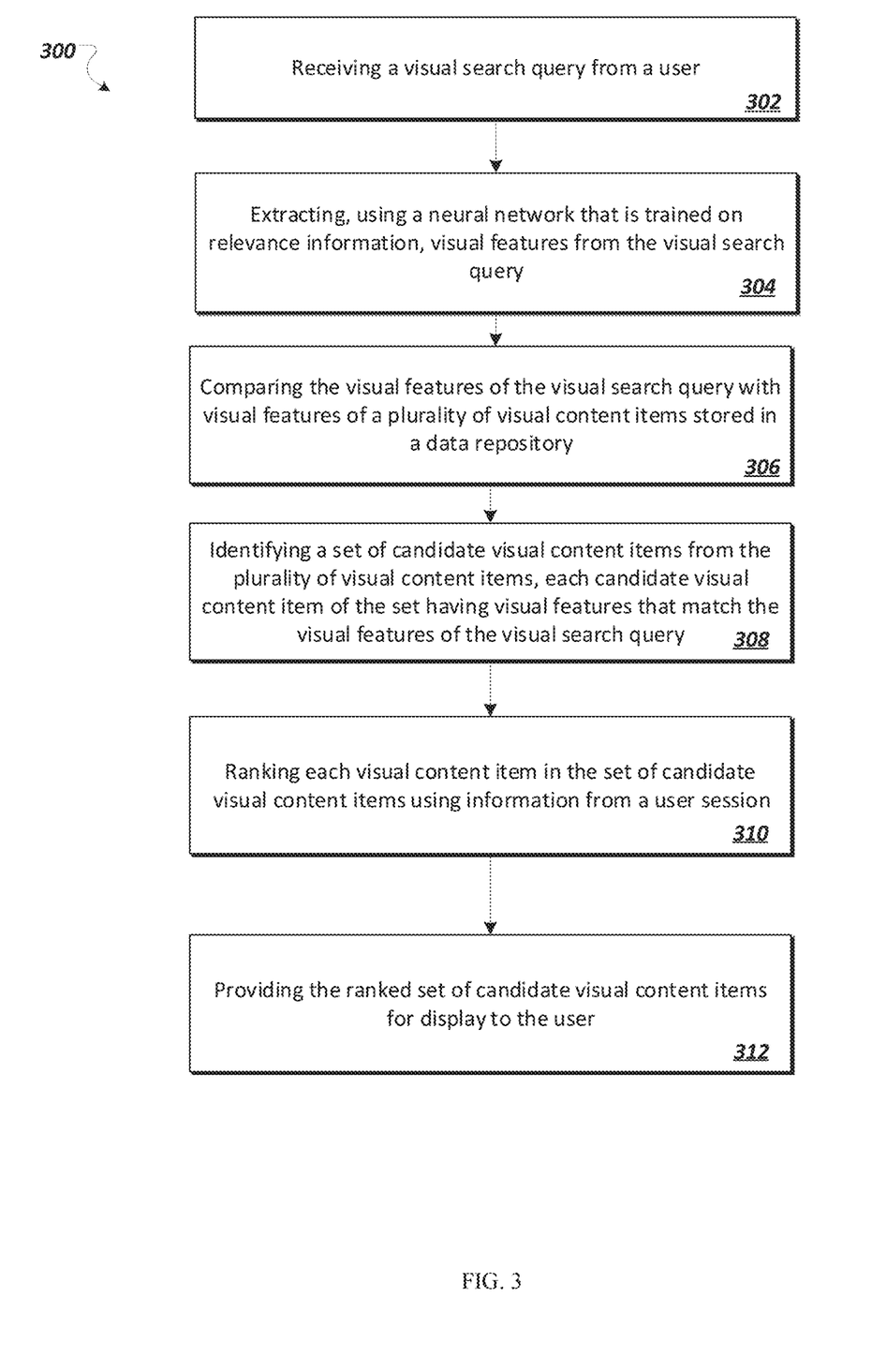
FIG. 3 is a flowchart of an example process for quickly identifying content items that are related to a visual search query using filtering and/or ranking.

FIG. 3 is a flowchart of an example process 300 for quickly identifying content items that are related to a visual search query using filtering and/or ranking. For convenience, the process 300 will be described as being performed by a system of one or more computers, located in one or more locations, and programmed appropriately in accordance with this specification. For example, a visual discovery system, e.g., the visual discovery system 100 of FIG. 1, appropriately programmed, can perform the process 300.

The visual discovery system identifies a visual search query (e.g., visual search query 101) responsive to an action from a user (e.g., the user 103) of a client device (e.g., the client device 104) (302). In some implementations, the visual search query can be in response to a user selection of an image, partial image, or collection of images that the visual discovery system presented to the user, as described above. For images presented to the user by the visual discovery system, the user selection of the image can be transmitted to the visual discovery system such that the visual discovery system can identify the particular image that was selected. The visual discovery system can then use information about that image to execute the visual search query.

The visual discovery system extracts visual features from the visual search query using a neural network that is trained on relevance information (304). As described above, in some implementations, the visual discovery system extracts features of a visual search query in real time after the user selection. In other implementations, the visual discovery system determines the features of the visual search query offline, not in real time prior to displaying the content items of the visual search query.

The visual discovery system then compares the visual features of the visual search query with visual features from visual content items that are stored in a data repository (306). The search space for comparison can be narrowed using information such as classification, as disclosed above. The system identifies a set of candidate visual content items from the visual content items in the data repository that match the visual features of the visual search query (308).

The visual discovery system ranks each candidate visual content item in the set of candidate visual content items using information from the user session and potentially other features (310). The system then ranks the candidate visual content items again on utility score based on click through rate. Once the candidate content items are filtered and ranked, the visual discovery system provides one or more of the filtered, ranked set of candidate visual content items to the client device for display to the user (312).

For example, in response to a user selection of an image presenting in an interface of the visual discovery system, the user can be presented with a user interface display that includes an enlarged version of the selected image and one or more related images. The related images can include the one or more candidate content items. In some implementations, the related images also include one or more other images identified by another process of the visual discovery system.

The visual discovery system may identify similar content to present to a user using the techniques described above. The similar content may include other images with visually similar features and classification. Additionally, or alternatively, the similar content may be content items, e.g., advertisements that are visually similar and similarly classified to the selected image.

Although the visual discovery system has been described as searching for content items related to a selected image, the search may be trigged by some other engagement or action including actions that do not require user interaction or user selection.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for visual discovery of visual content, the method comprising:
  identifying a visual search query responsive to an action associated with an image presented to a user of a client device by a social media platform;
  obtaining visual features from the visual search query;
  obtaining one or more categories of the visual search query from annotations associated with the visual search query;
  identifying a set of candidate visual content items comprising:
    identifying a plurality of visual content items, from a collection of visual content items, associated with categories corresponding to the one or more categories of the visual search query;
    comparing the visual features of the visual search query with visual features of the plurality of visual content items; and
    identifying the set of candidate visual content items from the plurality of visual content items, each candidate visual content item of the set of candidate visual content items having visual features that are similar to the visual features of the visual search query using an exact nearest neighbor algorithm;
  filtering the set of candidate visual content items based at least in part on visual content items that the user has previously interacted with during a current user session, wherein the filtering produces a filtered set of candidate visual content items by removing candidate visual content items that do not include a visual feature that is included in the previously interacted with visual content items; and
  providing one or more candidate visual content items from the filtered set of candidate visual content items to the client device for display to the user.

2. The method of claim 1, further comprising:
  ranking each candidate visual content item in the filtered set of candidate visual content items, wherein the ranking comprises:
    ranking each candidate visual content item in the set of candidate visual content items using at least query features related to the visual search query, content features related to the visual search query, the visual search query and content balance features, or context features related to the visual search query.

3. The method of claim 2, wherein query features related to the visual search query include user features related to the user from whom the visual search query was received and features of the visual search query.

4. The method of claim 2, wherein content features related to the visual search query include a keyword of the visual search query, a category related to the visual search query, an advertisement identifier related to the visual content, or a campaign identifier related to the visual search query.

5. The method of claim 2, wherein query and content balance features include similarity scores in text, category, and topic space between the visual search query and the candidate visual content item, a visual similarity score between the visual search query and the candidate visual content item, and a text embedding similarity score between the visual search query and the candidate visual content item.

6. The method of claim 2, wherein the context features include a type of device of the user from which the visual search query was received, a type of network used to send or receive the visual search query, a position of the visual search query on a content page, or a time of day at which the visual search query was received.

7. The method of claim 1, wherein information from a user session includes information about a previous search history of the user in the current user session.

8. The method of claim 1, further comprising:
prior to providing the set of candidate visual content items for display to the user, ranking the set of candidate visual content items based at least in part on a utility score calculated using a predicted click through rate of each candidate visual content item and a cost associated with each candidate visual content item.

9. The method of claim 8, further comprising:
determining whether the utility score for each candidate visual content item for display satisfies a threshold; and
in response to determining that a candidate visual content item for display does not satisfy the threshold, removing the candidate visual content item from the set of visual content items for display.

10. The method of claim 1, wherein extracting visual features from the visual search query occurs in real time after receiving the visual search query from the user.

11. The method of claim 1, wherein filtering the set of candidate visual content items further comprises:
identifying, from the current user session, at least one object in the visual content items from the current user session in which the user has shown interest;
for each candidate visual content item,
determining whether the candidate visual content item contains the at least one object in which the user has shown interest or an image that is visually similar to the at least one object in which the user has shown interest; and
in response to determining that the candidate visual content item contains the at least one object in which the user has shown interest or an image that is visually similar to the at least one object in which the user has shown interest, including, in the filtered set of candidate visual content items, the candidate visual content item.

12. The method of claim 1, wherein identifying the set of candidate visual content items comprises selecting a plurality of subsets of visual content items based on particular types of features and then identifying the set of candidate visual content items from among the plurality of subsets of visual content items.

13. The method of claim 12, wherein a visual content item is selected from respective subsets of the plurality of subsets of visual content items in a round robin fashion until the set of candidate visual content items reaches a specified number.

14. The method of claim 13, wherein each subset of visual content items includes visual content items that are ranked based on a respective feature type of the subset of visual content items, and wherein each subset is further associated with a corresponding probability such that a combined probability of the subsets of visual content items is equal to 1.

15. The method of claim 14, wherein selecting each candidate visual content item from the plurality of subsets of visual content items comprises:
generating a random number in a set [0, 1);
comparing the random number to the corresponding probabilities of each subset of visual content items; and
selecting from a particular subset based on the comparing.

16. The method of claim 1, further comprising:
ranking the filtered set of candidate visual content items according to one or more ranking criteria, wherein each candidate visual content item includes one or more assigned weights including first weights of a visual similarity between the candidate visual content item and each visual content item of the current user session.

17. The method of claim 16, wherein the first weights vary depending on when the user interacted with the visual content items during the current user session.

18. A system comprising:
one or more computers; and
one or more storage devices storing instructions that are operable, when executed by the one or more computers, to cause the one or more computers to perform operations comprising:
identifying a visual search query responsive to an action associated with an image presented to a user of a client device by a social media platform;
obtaining visual features from the visual search query;
obtaining one or more categories of the visual search query from annotations associated with the visual search query;
identifying a set of candidate visual content items comprising:
identifying a plurality of visual content items, from a collection of visual content items, associated with categories corresponding to categories of the visual search query;
comparing the visual features of the visual search query with visual features of the plurality of visual content items; and
identifying the set of candidate visual content items from the plurality of visual content items, each candidate visual content item of the set of candidate visual content items having visual features that are similar to the visual features of the visual search query using an exact nearest neighbor algorithm;
filtering the set of candidate visual content items based at least in part on visual content items that the user has previously interacted with during a current user session, wherein the filtering produces a filtered set of candidate visual content items by removing candidate visual content items that do not include a visual feature that is included in the previously interacted with visual content items; and
providing one or more candidate visual content items from the filtered set of candidate visual content items to the client device for display to the user.

19. The system of claim 18, further comprising:
ranking each candidate visual content item in the filtered set of candidate visual content items, wherein the ranking comprises:
ranking each candidate visual content item in the set of candidate visual content items using at least query features related to the visual search query, content features related to the visual search query, the visual search query and content balance features, or context features related to the visual search query.

20. The system of claim 19, wherein query features related to the visual search query include user features related to the user from whom the visual search query was received and features of the visual search query.

21. The system of claim 18, wherein information from a user session includes information about a previous search history of the user in the current user session.

22. The system of claim 18, wherein the operations further comprise:
prior to providing the set of candidate visual content items for display to the user, ranking the set of candidate visual content items based at least in part on a utility score calculated using a predicted click through rate of each candidate visual content item and a cost associated with each candidate visual content item.

23. The system of claim 18, wherein extracting visual features from the visual search query occurs in real time after receiving the visual search query from the user.

24. The system of claim 18, wherein ranking each visual content item in filtering the set of candidate visual content items using information from a user session further comprises:
identifying, from the current user session, at least one object in the visual content items from the current user session in which the user has shown interest;
for each candidate visual content item,
determining whether the candidate visual content item contains the at least one object in which the user has shown interest or an image that is visually similar to the at least one object in which the user has shown interest; and
in response to determining that the candidate visual content item contains the at least one object in which the user has shown interest or an image that is visually similar to the at least one object in which the user has shown interest, including, in the filtered set of candidate visual content items, the candidate visual content item.

25. One or more non-transitory computer-readable storage mediums comprising instructions stored thereon that are executable by a processing device and upon such execution cause the processing device to perform operations comprising:
identifying a visual search query response to an action associated with an image presented to a user of a client device by a social media platform;
obtaining visual features from the visual search query;
obtaining one or more categories of the visual search query from annotations associated with the visual search query;
identifying a set of candidate visual content items comprising:
identifying a plurality of visual content items, from a collection of visual content items, associated with categories corresponding to categories of the visual search query;
comparing the visual features of the visual search query with visual features of the plurality of visual content items; and
identifying the set of candidate visual content items from the plurality of visual content items, each candidate visual content item of the set of candidate visual content items having visual features that are similar to the visual features of the visual search query using an exact nearest neighbor algorithm;
filtering the set of candidate visual content items based at least in part on visual content items that the user has previously interacted with during a current user session, wherein the filtering produces a filtered set of candidate visual content items by removing visual content items that do not include a visual feature that is included in the previously interacted with visual content items; and
providing one or more candidate visual content items from the filtered set of candidate visual content items to the client device for display to the user.

\* \* \* \* \*